United States Patent [19]
Hashimoto et al.

[11] Patent Number: 5,059,469
[45] Date of Patent: Oct. 22, 1991

[54] MAGNETIC RECORDING MEDIUM

[75] Inventors: Minoru Hashimoto, Yokohama; Yoshihito Tsugane, Yamato, both of Japan

[73] Assignee: Kabushiki Kaisha Toshiba, Kawasaki, Japan

[21] Appl. No.: 536,992

[22] Filed: Jun. 12, 1990

Related U.S. Application Data

[63] Continuation-in-part of Ser. No. 529,760, May 29, 1990, abandoned, which is a continuation of Ser. No. 192,290, May 10, 1988, abandoned.

[30] Foreign Application Priority Data

May 13, 1987 [JP] Japan .................................. 62-116079

[51] Int. Cl.$^5$ ............................................. G11B 23/00
[52] U.S. Cl. .................................... 428/141; 428/329; 428/694; 428/695; 428/900
[58] Field of Search ............... 428/141, 694, 695, 900, 428/329, 143

[56] References Cited

U.S. PATENT DOCUMENTS

| | | | |
|---|---|---|---|
| 4,450,199 | 5/1984 | Todokoro et al. | 428/694 |
| 4,537,833 | 8/1985 | Kasuga et al. | 428/695 |
| 4,678,706 | 7/1987 | Tokunaga et al. | 428/695 |
| 4,701,372 | 10/1987 | Akiyama et al. | 428/695 |
| 4,705,718 | 11/1987 | Kitahota et al. | 428/695 |
| 4,828,903 | 5/1989 | Ejiri et al. | 428/694 |

Primary Examiner—Paul J. Thibodeau
Attorney, Agent, or Firm—Finnegan, Henderson, Farabow, Garrett, and Dunner

[57] ABSTRACT

The magnetic recording medium has superposed on at least one surface of a non-magnetic support member a magnetic layer possessing a surface shape such that the space-average wavelength ($2\alpha a$) is in the range of 15 μm to 30 μm and the surface-average roughness (sRa) in the range of 0.008 μm to 0.025 μm. The magnetic recording medium combines highly satisfactory property of media and magnetic interface with high durability and high reproducing output.

16 Claims, 1 Drawing Sheet

MAGNETIC RECORDING MEDIUM

This application is a continuation-in-part of application Ser. No. 07/529,760, filed May 29, 1990 now abandoned which was a continuation of application Ser. No. 07/192,290 filed May 10, 1988, now abandoned.

The present application claims priority of Japanese Patent Application No. 62-116079 filed on May 13, 1987.

FIELD OF THE INVENTION AND RELATED ART STATEMENT

This invention relates to a magnetic recording medium. More particularly this invention relates to a magnetic recording medium excelling in property of media and magnetic interface and durability and possessing a high recording density.

Generally, the magnetic recording medium is produced by preparing a magnetic coating material having a magnetic particle uniformly dispersed in a solution of a binder resin in an organic solvent, applying the magnetic coating material on the surface of a non-magnetic supporting member such as polyester film, optionally subjecting the layer of coating material to an orienting treatment, and then processing the resultant composite in a drying step and a surface smoothening step.

As universally known the magnetic recording medium finds extensive utility in recording information on VTR, various audio devices,, and various data recording devices. In recent years, studies are being devoted to the improvement of recording systems and the impartation of improved quality of the magnetic recording medium itself, both for increasing the recording density of the magnetic recording medium. Particularly concerning the magnetic recording medium itself, studies are being made in search of a method for effecting high-density recording by materializing perpendicular magnification recording with a recording medium using a microfine magnetic particle of hexagonal ferrite.

Magnetic recording media have varying design concept to suit purposes for which they are used. Particularly, the magnetic recording medium to be utilized in a floppy disc is designed with more emphasis on the improvement in reliability of performance rather than on the improvement in recording density of the magnetic recording medium itself.

Where a magnetic recording medium of this sort is to be given an increased capacity for recording density, it requires the surface quality to be notably improved to offer an increased reproducing output. The improvement in the surface quality entails a disadvantage that since the area of contact between the recording-reproducing head and the surface of the magnetic recording medium is consequently increased, the property of media and magnetic interface and durability of the magnetic recording medium are degraded. As a means of improving this property and durability, the method which resorts to combined use of different lubricants has been known to the art. This method, however, is not so effective as to improve this property and durability to a fully sufficient extent.

SUMMARY AND OBJECT OF THE INVENTION

As parameters indicative of the surface quality, average roughness along the center line (Ra), ten-point average roughness (Rz), maximum roughness (Rmax), routmeansquare roughness (Rr.m.s.) and the like have been generally known. Particularly for this invention, with due respect to the relation between the magnetic recording medium and the magnetic head, the surface-average roughness (sRa) of three-dimensional representation and the space average wavelength (sλa) indicative of shape are adopted.

The surface roughness is defined in Japanese Industrial Standard (JIS) B 0601 titled "Definition and Designation of Surface Roughness." Here, it is modified so as to define a three-dimensional roughness. The surface-average roughness is a parameter corresponding to the average roughness (Ra) along the straight line and, in the orthogonal coordinate system having the X axis and the Y axis thereof laid from the rough surface on the center surface and the Z axis thereof laid vertically to the center surface, is represented by the following formula.

$$sRa = 1/S \int_0^{L_x} \int_0^{L_y} |f(x,y)| \, d_x d_y \quad (1)$$

(wherein $L_x \times L_y = S$)

This surface-average roughness (sRa) is found as follows.

First, from the starting points set at fixed intervals in the Y direction, surface roughness is measured in a length L, toward the X direction. Then, an integral value is found from the lines of rough surface f(X) between O and $L_x$. This calculation is carried out with respect to the lines of rough surface between O and $L_y$ in the O and $L_y$. The average is found of the values consequently obtained. The average thus obtained represents the surface-average roughness (sRa).

The space-average wavelength (sλa) is such that in a surface form represented by a sine function, y = Asin ω ox, wherein WO stands for spatial angular vibration and A for amplitude, the space wavelength will be found by the following formula:

$$\frac{2\pi Ra}{\Delta a} = \frac{2\pi/l \int_0^l |y| \, d_x}{1/l \int_0^l |d_y/d_x| \, d_x} = \frac{2\pi}{\omega o} = \lambda a \quad (2)$$

X stands for the axis taken along the center line of the roughness of the surface subjected to the measurement mentioned above and Y for the function f(X), and the space-average wavelength (sλa) for the function f(X) will be the spatial wavelength, λa, of the sine function which satisfies the formula (2) with respect to the f(X). The average wavelength of the three-dimensional surface roughness, therefore, is found from the following formula:

$$\frac{\pi sRa}{s\Delta a} = s\lambda a \quad (3)$$

wherein sΔa stands for three-dimensional surface-average roughness and sRa for three-dimensional average gradient From the surface roughness of a medium, the three-dimensional surface-average roughness sΔa is found by cutting sections in the surface shape obtained by the aforementioned method, measuring areas of particles revealed in the sections and taking count of particles, calculating average circles severally in the sections finding an increment, Δr, in each of the radial of the average circles, and determining the three-dimensional surface-average roughness sΔa based on the ratio of Δz/Δr. Then, the increment ΔΛa is calculated by the formula (3) using the value of sRa which has been derived from the formula (1).

The inventors prepared a number of magnetic recording media differing in surface condition and tested them for surface quality, durability, and reproducing output. From the experiment, they have found that a correlation exists between the space-average wavelength (sλa) and the surface-average roughness (sRa) as one part and the durability, the friction coefficient, and the reproducing output as the other part and that a magnetic recording medium vested with high property of media and magnetic interface, high durability, and high reproducing output is obtained by adjusting the profile of the surface of the magnetic recording medium.

Specifically, as illustrated in FIG. 1, when the surface-average roughness (sRa) is fixed and the space-average wavelength (sΔa) is varied, the durability decreases in proportion as the space-average wavelength (sλa) increases. Conversely, when the space-average wavelength (sλa) is fixed and the surface-average roughness (sRa) is varied, the durability increases in proportion as the surface-average roughness (sRa) increases.

As illustrated in FIG. 2, the friction coefficient (μK) and the reproducing output (dB) both increase in proportion as the space-average wavelength (sλa) increases.

An attempt at decreasing the surface-average roughness (sRa) tends to increase the space-average wavelength (sλa). The range in which these properties prove to be optimum for all the other properties, therefore, is relatively narrow.

An object of this invention, therefore, is to provide a magnetic recording medium which is capable of manifesting highly desirable property of media and magnetic interface, high durability, and high reproducing output.

Another object of this invention is to provide a magnetic recording medium which fits high density recording.

The other objects of this invention will become apparent from the further description of this invention to be given below.

The objects of this invention described above are accomplished in a first embodiment in a magnetic recording medium provided on at least one surface of a nonmagnetic supporting member with a magnetic layer by adapting the surface quality of the magnetic layer so that the space-average wavelength (sλa) will fall in the range of 15μm to 30μm and the surface-average roughness (sRa) in the range of 0.008μm to 0.025 μm.

In the above first embodiment of the present invention, the value of the space-average wavelength (sλa) is limited to the aforementioned range for the following reason. If the surface shape is such that the space-average wavelength (sλa) exceeds 30 μm, the magnetic recording medium has a disadvantage that the durability thereof is insufficient, the surface thereof is so heavily undulated as to render it is difficult to obtain necessary head touch, and the modulation is inevitably suffered to increase. An attempt at forming a magnetic layer having a wavelength of less than 15 μm results in an extreme decrease in the efficiency of the calendering treatment such that the breaking strength and the packing density of the applied layer will be degraded and high durability will not be attained without any sacrifice in the characteristic of high density.

In the above first embodiment of the present invention, the surface-average roughness (sRa) of the magnetic recording medium is limited to the range of 0.008 μm to 0.025 μm for the following reason, If the value of sRa is less than 0.008 μm, the magnetic recording medium betrays notable deficiency in friction coefficient and durability, though the reproducing output is high. In another embodiment of the present invention in the case where a high density magnetic recording medium having an increasing output is expected at some sacrifice of high durability, the value of sRa may be in the range of 0.006 μm to 0.008 μm. But it is not practical that the magnetic recording medium having the surface-average roughness (sRa) less than 0.006 μm has concurrently with the space-average wavelength (sλa) in the range of 15 μm to 30 μm, because it is difficult to produce the medium with good reproducibility, and the durability of the medium results in a rapid decrease. Conversely, if this value exceeds 0.025 μm, the magnetic recording medium suffers from deficiency in output, though it enjoys stable property of media and magnetic interface and durability. In another embodiment of the present invention, a magnetic recording medium such as a floppy disc, comprises a nonmagnetic supporting member and a magnetic layer formed on at least one surface of the supporting member. The magnetic layer comprises a hexagonal ferrite magnetic particle, a nonmagnetic particle and a binder resin with the nonmagnetic particle having an average particle diameter in the range of 200 nm to 400 nm and possessing a surface shape such that the space-average wavelength (sλa) falls in the range of 15 μm to 30 μm and the surface-average roughness (sRa) is in the range of 0.006 μm to 0.008 μm. A suitable nonmagnetic particle is an electroconductive carbon black particle. A hexagonal ferrite magnetic particle of this embodiment has an average particle diameter in the range of 0.001 μm to 0.2 μm.

As examples of the material for the magnetic particle for effective use in the magnetic layer of the invention, various magnetic metals such as γ-Fe₂O₃, cobalt-absorbed Co-γ-Fe₂O₃, CrO₃ and Ba-ferrite are illustrative. Particularly, magnetic metal particle and hexagonal ferrite particle are suitable for high-density recording.

As examples of the hexagonal magnetic particle, hexagonal ferrite particles represented by the following general formula are illustrative.

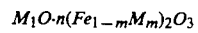

(wherein $M_1$ stands for one element selected from the group consisting of Ba, Sr, Ca and Pb, n for a number in the range of 5.4 to 6.0, M for one metal element selected from the group consisting of Ti, Co, Zn, In, Mn, Cu, Ge, Ta, Nb, Te, Zr, V, Al and Sn, and m for a number in the range of 0 to 2).

Particularly for this invention, a substituted hexagonal ferrite particle possessing an average particle diameter in the range of 0.001 to 0.2 μm and a coercive force in the range of 200 to 2,000 Oe and having part of the Fe atom thereof substituted with at least one metallic element selected from the group consisting of Ti, Co, Zn, In, Mn, Cu, Ge, Ta, Nb, Te, Zr, V, Al and Sn is suitable.

The relation of the amount of the element used for the substitution will be described below with reference to a magneto-plumbite type Ba-ferrite. The substituent in this case is represented by the following chemical formula.

$$BaFe_{12-(x+y(+z))}M_{IIx}M_{Vy}(M_{IVz})O_{19}$$

In the formula, x, y and z stand for the amounts respectively of $M_{II}$, $M_V$ and $M_{IV}$ elements per chemical formula. The symbols $M_{II}$, $M_V$ and $M_{IV}$ stand respectively for divalent, pentavalent, and tetravalent elements and the Fe atom subjected to substitution is a trivalent element. Thus the relation, $y=(x-y)/2$, is established. The amount of $M_{IV}$ used for substitution is definitely fixed by the amounts of $M_{II}$ and $M_V$ used for substitution and the amounts of $M_{II}$ and $M_V$ are in such a relation that one of them is automatically fixed when the other is fixed.

The amounts of these elements for substitution are empirically selected so that the coercive force of the produced magnetic layer will fall in the range of 200 to 2,000 Oe.

As the binder resin for use in the present invention, either polyurethane resin or a mixture of polyurethane resin with other resin is employed.

The polyurethane resin mentioned above is chiefly of a grade having a molecular weight the range of 20,000 to 50,000. If a molecular weight of the polyurethane resin is less than 20,000, the magnetic recording medium can not enjoy high durability.

When a polyurethane resin having a molecular weight of not more than 50,000 and a polyurethane resin having a molecular weight in the range of 80,000 to 100,000 are used as mixed, the produced magnetic layer enjoys enhanced durability. The dispersibility of magnetic particle in this mixture is lowered as the mixing ratio of the polyurethane resin having a molecular weight of not less than 80,000 is increased. The mixing ratio of the polyurethane resin, therefore, is desired to fall approximately in the range of 10 to 50 parts by weight, based on 100 parts by weight of the polyurethane resin having a molecular weight of not more than 50,000.

As concrete examples of the polyurethane resin having molecular weight of not more than 50,000, the products of Nippon Polyurethane Industry Co., Ltd. marketed under product codes of N-3135 and N-3127 and the products of Dainichiseika Colour & Chemical Mfg. Co., Ltd. marketed under product codes of MAU-7300 and MAU-2360 are illustrative. As concrete examples of the polyurethane resin having molecular weight of not less than 80,000, the products of Nippon Polyurethane Industry Co., Ltd. marketed under product codes of N-2302 and N-3022 are illustrative.

The other resin which is used as mixed with the polyurethane resin may be at least one member selected from the group consisting of cellulose derivative resin, polyester resin, polycarbonate resin, polyacrylate resin, polyamide resin, epoxy resin, phenol resin, polyether resin, phenoxy resin, melamine resin, vinyl butyral resin, furan resin, vinyl chloride resin, vinyl acetate resin, vinyl alcohol resin, copolymers thereof, and mixtures thereof. Particularly, the cellulose derivative resin or the vinyl chloride-vinyl acetate resin is used advantageously because the magnetic particle exhibits high dispersibility in the resin.

Generally, the additional resin is used in an amount in the range of 0 to 50 parts by weight, based on 100 parts by weight of the polyurethane resin.

The magnetic coating material, when necessary, may incorporate therein a lubricant, a dispersant, an abradant, or a conductivity imparting agent such as carbon black.

Examples of the lubricant usable herein include higher saturated fatty acids, higher unsaturated fatty acids, and esters thereof each having not less than 14 carbon atoms, silicone type compounds, fluorinated hydrocarbons, and mixtures thereof.

Examples of the aforementioned higher fatty acids and esters thereof, include saturated fatty acids such as pentadecylic acid, palmitic acid, heptadecylic acid, stearic acid, and nonadecanoic acid, unsaturated fatty acids such as oleic acid, eleidic acid, linolic acid, and linolenic acid, and higher alkyl esters thereof.

These fatty acids and esters thereof having not less than 14 carbon atoms exhibit satisfactory affinity for the binder resin and produce a more desirable lubricating effect on the surface of the magnetic recording medium than lower fatty acids.

As examples of the dispersant, anionic surfactants (surface active agents), cationic surfactants, nonionic surfactants, silane coupling agents, and titanium coupling agents are illustrative.

As examples of the abradant, powders of such inorganic compounds as chromium oxide, alumina, silicone carbide, titania, and Zirconia which have degrees of not less than 5 in Mohs' scale are illustrative.

The amounts of such additives as mentioned above to be used herein are desired as small as permissible to ensure manifestation of amply high reproducing output. Suitably, the amount of the lubricant is from 1 to 5 parts by weight and that of the dispersant is not more than 4 parts by weight, the amount of the abradant is 2 to 6 parts by weight, and the amount of carbon black not more than 3 parts by weight, each based on 100 parts by weight of the magnetic particle. Further, the addition of nonmagnetic particles having an average diameter in the range of 200 nm to 400 nm makes it easily possible to produce a magnetic recording medium having a surface-average roughness (sRa) in the range of 0.006 μm to 0.008 μm and a space-average roughness (sλa) in the range of 15 μm to 30 μm, thereby making it possible to obtain a higher reproducing output power. Therefore, the magnetic recording medium obtained by such method is most suitable for a floppy disc requiring high recording density.

The magnetic recording medium of the present invention is obtained by dissolving or dispersing the binder resin, the magnetic particle, the lubricant, and other additives in a solvent, adding a curing agent to the resultant solution or dispersion, applying the resultant coating material on the non-magnetic medium, subjecting the resultant composite to an orienting treatment and a drying treatment, giving the produced layer a surface treatment as by calendering with a super calendering device under conditions fit for the magnetic layer, and crosslinking the magnetic layer at a suitable temperature. Then, the resultant composite is punched or slit to suit the particular application and is given a smoothened surface to be finished. Optionally, an electroconductive layer may be formed on a non-magnetic substrate and the magnetic layer supperposed on this layer. In this case, the magnetic coating does not require incorporation of any electroconductive carbon therein.

DESCRIPTION OF PREFERRED EMBODIMENTS

Figure 1:
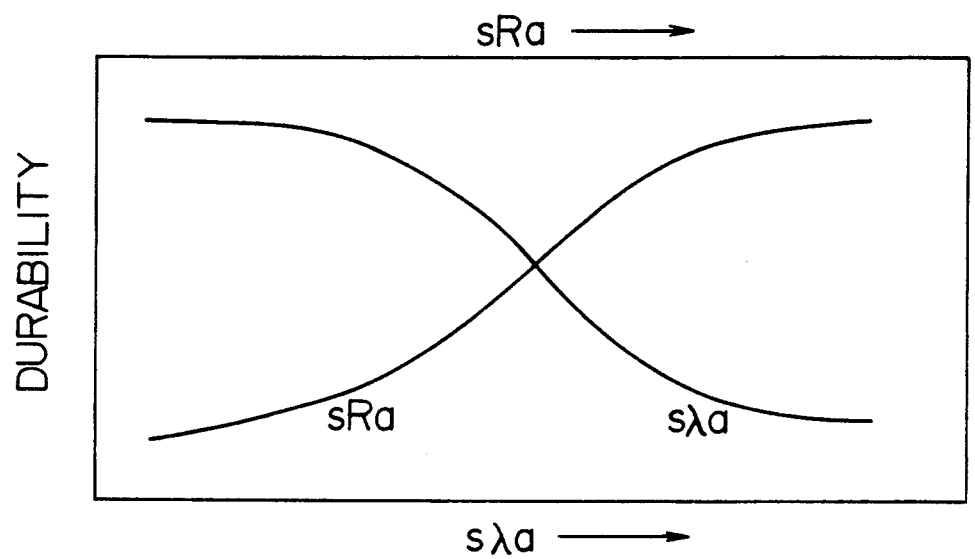
FIG. 1 is a graph showing the correlation between the space-average wavelength (sλa), the surface-average roughness (sRa), and the durability.
Figure 2:
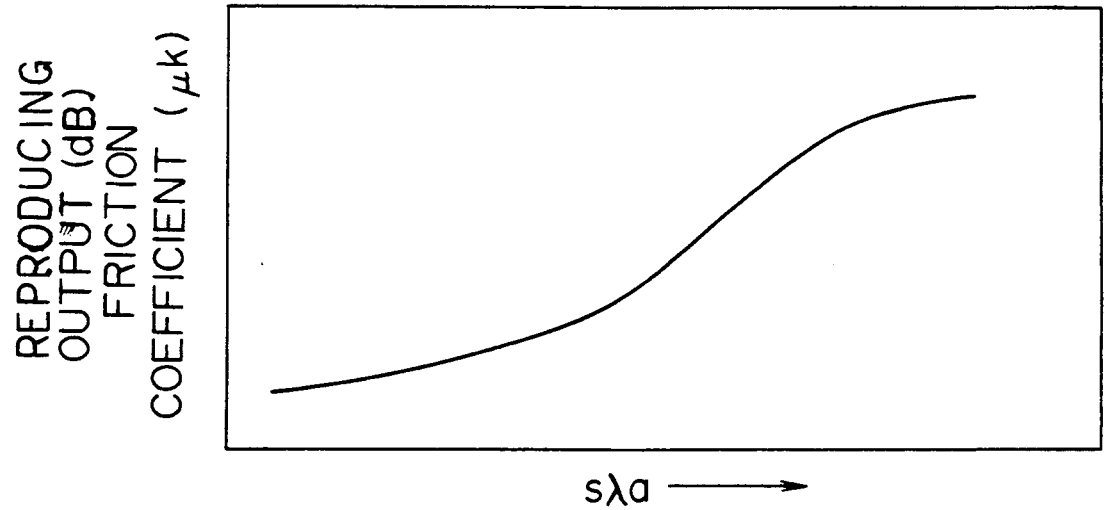
FIG. 2 is a graph showing the relation between the space-average wavelength (sλa) and the friction coefficient and the reproducing output.

Now, the present invention will be described below with reference to preferred embodiments. It should be noted, however, that this invention is not limited to these preferred embodiments.

EXAMPLE 1

| | | |
|---|---|---|
| Ba-ferrite powder (Ti, Co-substituted powder having average diameter 600 to 800 Å and coercive force of 700 Oe) | 666 | parts by weight |
| Nitrocellulose resin[*1] | 80 | " |
| Polyurethane resin (molecular weight 45,000)[*2] | 120 | " |
| Alumina (average diameter 0.15 μm) | 45 | " |
| Electroconductive carbon | 50 | " |
| Lecithin | 14 | " |
| Stearic acid | 8 | " |
| Butyl stearate | 17 | " |
| Methylethyl ketone | 500 | " |
| Toluene | 500 | " |
| Cyclohexanone | 500 | " |

[*1]Product of Daicel Chemical Industry Co., Ltd. marketed under product code of HC100.
[*2]Product of Nippon Polyurethane Industry Co., Ltd. marketed under product code of N-3127.

The components indicated above were dispersed in a sand mill to produce a magnetic coating material. This magnetic coating material was filtered to remove flocks and foreign particles and then mixed by stirring with 13 parts by weight of polyisocyanate compound (product of Nippon Polyurethane Industry Co., Ltd. and marketed under product code of "C-3041"). The magnetic coating material was applied on both sides of a polyester film 75 μm in thickness and dried, to produce magnetic layers. Then, in a super calendering device, the produced composite was treated at a temperature of 70° C. under a line pressure of 100kg/cm, then held at a temperature of 50° C. for 2 days to cure the magnetic layers. A disc 3.5 inches in diameter was punched out of the resultant composite to produce a magnetic disc. This disc was tested for surface roughness with a three-dimensional roughness tester (produced by Kosaka Kenkyusho and marketed under product code of "SE-3AK") and an analyzing device (produced by Kosaka Kenkyusho and marketed under product code of "SPA-11"), using a stylus of R 2 μm, 30 mgf.

EXAMPLE 2

A magnetic disc was produced by following the procedure of Example 1 except that the magnetic coating material obtained with the composition of Example 1 was applied on both sides of a polyester film 75 μm in thickness, dried to form magnetic layers, and treated with a super calendering device at a temperature of 70° C. under a line pressure of 200 kg/cm.

EXAMPLE 3

A magnetic disc was produced by following the procedure of Example 1 except that the magnetic coating material obtained with the composition of Example 1 was applied on both sides of a polyester film 75 μm in thickness, dried to form magnetic layers, and treated with a super calendering device at 70° C. under a line pressure of 300 kg/cm.

EXAMPLE 4

A magnetic disc was produced by following the procedure of Example 1 except that the same amount of vinyl chloride-vinyl acetate-vinyl alcohol copolymer resin (produced by U.C.C. and marketed under trademark designation of "VAGH") was used in the place of the nitrocellulose resin in the composition of Example 1.

EXAMPLE 5

A magnetic disc was produced by following the procedure of Example 4 except that the magnetic coating material obtained with the composition of Example 4 was applied on both sides of a polyester film 75 μm in thickness, dried to form magnetic layers, and treated with a super calendering device at a temperature of 70° C. under a line pressure of 200 kg/cm.

EXAMPLE 6

A magnetic disc was produced by following the procedure of Example 4 except that that the magnetic coating material obtained with the composition of Example 4 was applied on both sides of a polyester film 75 μm in thickness, dried to form magnetic layers, and then treated with a super calendering device at a temperature of 70° C. under a line pressure of 300 kg/cm.

EXAMPLE 7

A magnetic disc was produced by following the procedure of Example 1 except that the magnetic coating material obtained by using 133 parts by weight of polyurethane resin having a molecular weight of 50,000 (produced by Nippon Polyurethane Industry Co., Ltd. and marketed under product code of "N-3135") in the place of the nitrocellulose resin in the composition of Example 1, applied on both sides of a polyester film 75 μm in thickness, and dried to form magnetic layers.

EXAMPLE 8

A magnetic disc was produced by following the procedure of Example 7 except that the magnetic coating material obtained with the composition of Example 7 was applied on both sides of a polyester film 75 μm in thickness, dried to form magnetic layers, and treated with a super calendering device at a temperature of 70° C. under a line pressure of 200 kg/cm.

COMPARATIVE EXPERIMENT 1

A magnetic disc was produced by following the procedure of Example 1 except that the magnetic coating material obtained with the composition of Example 1 was applied on both sides of a polyester film 75 μm in thickness, dried to form magnetic layers, and treated with a super calendering device at a temperature of 85° C. under a line pressure of 200 kg/cm.

COMPARATIVE EXPERIMENT 2

A magnetic disc was produced by following the procedure of Example 1 except that the magnetic coating material obtained with the composition of Example 1 was applied on both sides of a polyester film 75 μm in thickness, dried to form magnetic layers, and treated with a super calendering device at a temperature of 50° C. under a line pressure of 300 kg/cm.

COMPARATIVE EXPERIMENT 3

A magnetic disc was produced by following the procedure of Example 4 except that the magnetic coating material obtained with the composition of Example 4 was applied on both sides of a polyester film 75 μm in thickness, dried to form magnetic layers, and treated with a super calendering device at a temperature of 85° C. under a line pressure of 250 kg/cm.

COMPARATIVE EXPERIMENT 4

A magnetic disc was produced by following procedure of Example 7 except that the magnetic coating material obtained with the composition of Example 7 was applied on both sides of a polyester film 75 μm in thickness, dried to form magnetic layers, and treated with a super calendering device at a temperature of 50° C. under a line pressure of 200 kg/cm.

EXAMPLE 9

A magnetic disc was produced by following the procedure of Example 1 except that 36 parts by weight of a polyurethane resin having a molecular weight of 85,000 (produced by Nippon Polyurethane Industry Co., Ltd. and marketed under product code of "N-3022") was used to substitute for part of the polyurethane resin having a molecular weight of 45,000 (produced by Nippon Polyurethane Industry Co., Ltd. and marketed under product code of "N-3127") in the composition of Example 1

EXAMPLE 10

A magnetic disc was produced by following the procedure of Example 4 except that a polyurethane resin having a molecular weight of 83,000 (produced by Nippon Polyurethane Industry Co., Ltd. and marketed under product code of "N-2302") was used in the place of 36 parts by weight of the polyurethane resin (produced by Nippon Polyurethane Industry Co., Ltd. and marketed under product code of "N-3127").

EXAMPLE 11

A magnetic disc was produced by following the procedure of Example 7 except that a polyurethane resin having a molecular weight of 85,000 (produced by Nippon Polyurethane Industry Co., Ltd. and marketed under product code of "N-3022") was used in the place of 60 parts by weight of the polyurethane resin having a molecular weight of 45,000 (produced by Nippon Polyurethane Industry Co., Ltd. and marketed under product code of "N-3127") in the composition of Example 7.

A magnetic disc was produced by following the procedure of Example 1, except that 12 parts by weight of polyurethane resin having a molecular weight of 85,000 (N 3022) was used to substitute for part of the polyurethane resin having a molecular weight of 45,000 and 30 parts be weight of electroconductive carbon having an average particle diameter of 400 nm in the composition of Example 1.

EXAMPLE 13

A magnetic disc was produced by following the procedure of Example 1, except that 12 parts by weight of polyurethane resin having a molecular weight of 83,000 (N 2302) was used to substitute for part of the polyurethane resin having a molecular weight of 45,000 and 30 parts by weight of electroconductive carbon having an average particle diameter of 200 nm in the composition of Example 1.

EXAMPLE 14

A magnetic disc was produced by following the procedure of Example 1, except that 60 parts be weight of polyurethane resin having a molecular weight of 83,000 (N 2302) was used to substitute for part of the polyurethane resin having a molecular weight of 45,000 in the composition of Example 1, and a super-calendering was carried by using the condition of Example 2.

COMPARATIVE EXPERIMENT 5

A magnetic disc was produced by following the procedure of Example 12, except that an electroconductive carbon having an average particle diameter of 50 nm was used in place of the electroconductive carbon having an average particle diameter of 400 nm in the composition of Example 12.

The magnetic discs obtained in the working examples and comparative experiments described above were tested for reproducing output, friction coefficient, and durability by the following methods.

Reproducing Output

On a single-sided head type disc drive provided with a head having an effective gap of 0.29 μm, a given magnetic disc was driven at a rotational speed of 300 r.p.m. to measure the reproducing output of 35 kBPI at a track position 32 mm from the disc center.

Friction Coefficient

On a double-sided head type disc drive, a given magnetic disc was driven to find the torque produced consequently by the motor of the disc drive and determine the friction coefficient by calculation using the magnitude of the torque.

Durability

On a double-sided head type disc drive, a given magnetic disc was driven and caused to record a recording signal at a track position 70. Under the condition which the temperature reciprocated between 5° C. and 60° C. over a cycle of 24 hours, the driving was continued until the reproducing output decreased to 70% of the initial level to take count of passes.

The results of the test are shown in the following table. These test results represent averages each obtained of five samples and reported with all figures below million reduced to zero.

| | Average wavelength (sλa) (μm) | Surface-average roughness (sRa) (μm) | Friction coefficient (μK) | Durability (10,000 passes) | Reproducing output* (dB) |
|---|---|---|---|---|---|
| Example | | | | | |
| 1 | 20 | 0.020 | 0.25 | 1500 | +1.5 |
| 2 | 27 | 0.013 | 0.23 | 1400 | +2.6 |
| 3 | 30 | 0.014 | 0.24 | 1350 | +2.6 |
| 4 | 25 | 0.013 | 0.21 | 1700 | +2.6 |
| 5 | 29 | 0.013 | 0.28 | 1350 | +2.6 |
| 6 | 30 | 0.020 | 0.26 | 1300 | +1.6 |
| 7 | 27 | 0.013 | 0.26 | 1450 | +2.8 |
| 8 | 30 | 0.012 | 0.30 | 1420 | +3.0 |
| 9 | 29 | 0.012 | 0.22 | 1800 | +2.0 |

-continued

| | Average wave-length (sλa) (μm) | Surface-average roughness (sRa) (μm) | Friction co-efficient (μK) | Durability (10,000 passes) | Reproducing output* (dB) |
|---|---|---|---|---|---|
| 10 | 30 | 0.013 | 0.27 | 1900 | +2.2 |
| 11 | 28 | 0.011 | 0.29 | 1600 | +2.0 |
| 12 | 18 | 0.007 | 0.20 | 1450 | +3.4 |
| 12 | 24 | 0.006 | 0.23 | 1600 | +3.0 |
| 14 | 15 | 0.009 | 0.20 | 1900 | +3.7 |
| Comparative Experiment | | | | | |
| 1 | 46 | 0.008 | 0.34 | 800 | +3.2 |
| 2 | 15 | 0.030 | 0.25 | 1100 | 0 |
| 3 | 45 | 0.009 | 0.43 | 700 | +3.3 |
| 4 | 32 | 0.047 | 0.24 | 1500 | −2.6 |
| 5 | 45 | 0.004 | 0.40 | 100 | +3.7 |

*Relative values, based on the result of Comparative Experiment 2 taken as 0 dB.

What is claimed is:

1. A magnetic recording medium comprising a nonmagnetic supporting member and a magnetic layer formed on at least one surface of said supporting member, said magnetic layer comprising magnetic particles and a binder resin and possessing a surface shape such that the space-average wavelength (sλa) falls in the range of 15 μm to 30 μm and the surface-average roughness (sRa) is in the range of 0.008 μm to 0.025 μm.

2. The magnetic recording medium according to claim 1, wherein said magnetic layer comprises 75 to 95% by weight of the magnetic particles and 5 to 25% by weight of the resin binder.

3. The magnetic recording medium according to claims 1 and 2, wherein said magnetic particles include hexagonal ferrite.

4. The magnetic recording medium according to claim 3, wherein said particles of hexagonal ferrite are represented by the general formula:

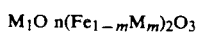

$$M_1O \cdot n(Fe_{1-m}M_m)_2O_3$$

wherein $M_1$ is an element selected from the group consisting of Ba, Sr, Ca and Pb, n is a number in the range of 5.4 to 6.0, M is a metallic element selected from the group consisting of Ti, Co, Zn, In, Mn, Cu, Ge, Ta, Nb, Te, Zr, V, Al and Sn, and m is a number in the range of 0 to 2.

5. The magnetic recording medium according to claim 4, wherein said particles of hexagonal ferrite include substituted hexagonal ferrite powder possessing an average particle diameter in the range of 0.01 to 0.2 μm and a coercive force in the range of 200 to 2,000 Oe and having part of the Fe atom thereof substituted with at least one metallic element selected from the group consisting of Ti, Co, Zn, In, Mn, Cu, Ge, Ta, Nb, Te, Zr, V, Al and Sn.

6. The magnetic recording medium according to claim 2, wherein said resin binder comprises 50 to 100% by weight of polyurethane resin crosslinked with a curing agent.

7. The magnetic recording medium according to claim 6, wherein said polyurethane resin comprises 90 to 50% polyurethane resin possessing a molecular weight of not more than 50,000 and 10 to 50% polyurethane possessing a molecular weight of not less than 80,000.

8. The magnetic recording medium according to claim 6, wherein said curing agent comprises a polyvalent isocyanate compound.

9. The magnetic recording medium according to claim 6, wherein said curing agent is incorporated in said resin binder in an amount in the range of 5 to 25% by weight.

10. The magnetic recording medium according to claim 6, wherein said resin binder further comprises at least one member selected from the group consisting of cellulose derivative resin, polyester resin, polycarbonate resin, polyacrylate resin, polyamide resin, epoxy resin, phenol resin, polyether resin, phenoxy resin, melamine resin, vinyl chloride resin, vinyl acetate resin, vinyl alcohol resin, and copolymers thereof, and mixtures thereof.

11. The magnetic recording medium according to claim 2, wherein said magnetic layer contains 1 to 5% by weight of at least one lubricant selected from the group consisting of higher saturated fatty acids, higher unsaturated fatty acids, and esters thereof, each having not less than 14 carbon atoms.

12. The magnetic recording medium according to claim 2, wherein said magnetic layer contains 2 to 6% by weight of an abradant.

13. A magnetic recording medium comprising a nonmagnetic supporting member and a magnetic layer formed on at least one surface of said supporting member, said magnetic layer comprising hexagonal ferrite magnetic particles, nonmagnetic particles and a binder resin, said nonmagnetic particles having an average particle diameter in the range of 200 nm to 400 nm and said magnetic layer possessing a surface shape such that the space-average wavelength (sλa) falls in the range of 15 μm to 30 μm and the surface-average roughness (sRa) is in the range of 0.006 μm to 0.025 μm.

14. The magnetic recording medium according to claim 13, wherein said hexagonal ferrite magnetic particles have an average particle diameter in the range of 0.001 μm to 0.2 μm.

15. The magnetic recording medium according to claim 13, wherein said magnetic recording medium is a floppy-disc.

16. The magnetic recording medium according to claim 13, wherein said nonmagnetic particles include electroconductive carbon black particles.

* * * * *